Figure 1:
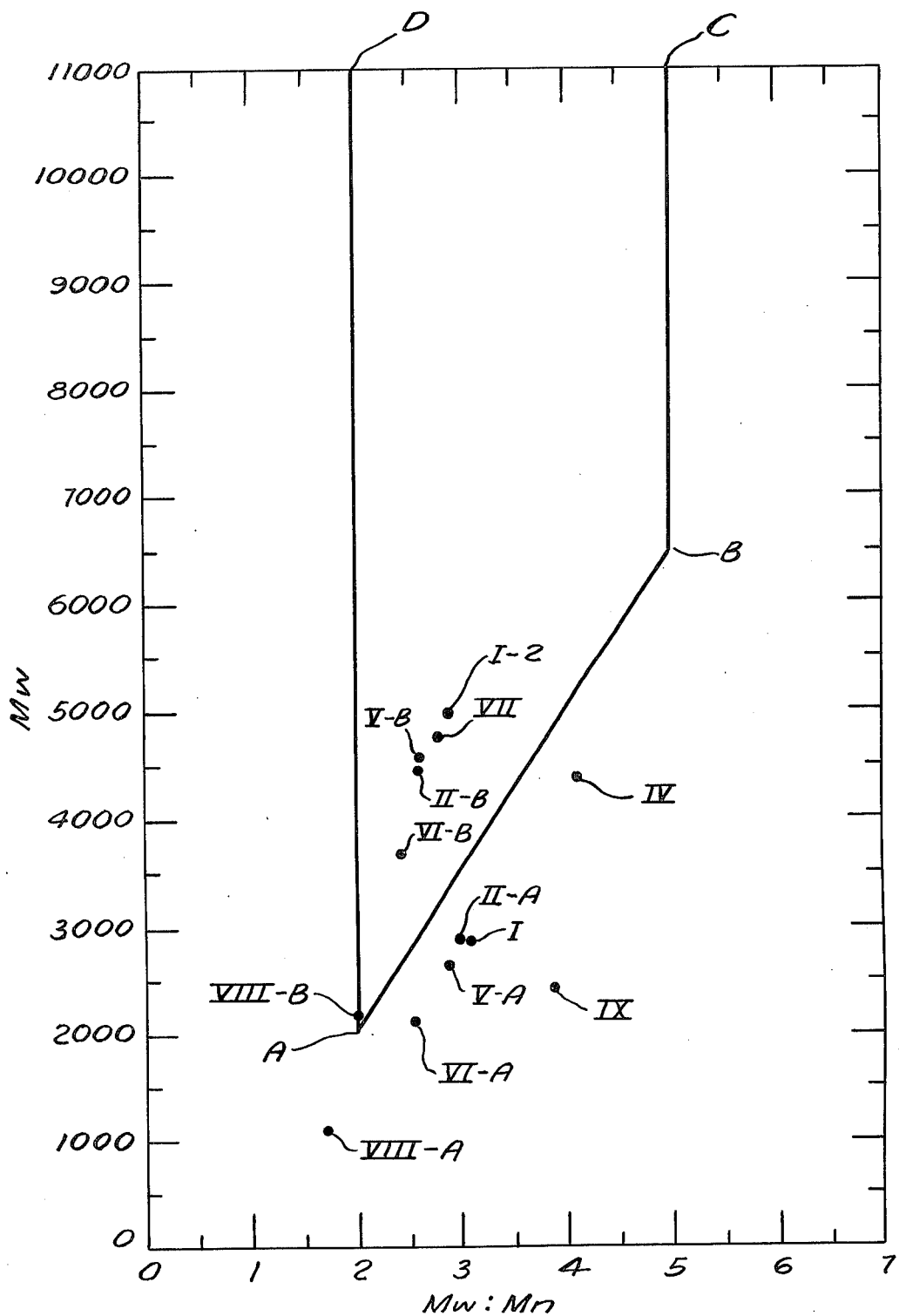

United States Patent [19]

Walker

[11] 3,928,288
[45] Dec. 23, 1975

[54] EPOXY NOVOLAC RESINS HAVING A NARROW MOLECULAR WEIGHT DISTRIBUTION AND PROCESS THEREFOR

[75] Inventor: Eddie Bob Walker, Lake Jackson, Tex.

[73] Assignee: The Dow Chemical Company, Midland, Mich.

[22] Filed: May 31, 1974

[21] Appl. No.: 475,015

Related U.S. Application Data

[63] Continuation-in-part of Ser. No. 350,277, April 11, 1973, abandoned.

[52] U.S. Cl. ................... 260/59 EP; 260/348 R
[51] Int. Cl.$^2$ ................................. C08G 59/08
[58] Field of Search ............... 260/59 CP, 348 R

[56] References Cited
UNITED STATES PATENTS

| | | | |
|---|---|---|---|
| 2,829,124 | 4/1958 | Napravnik et al. | 260/60 |
| 3,342,775 | 9/1967 | Aelony | 260/47 |
| 3,355,512 | 11/1967 | Acetis et al. | 260/830 |
| 3,767,624 | 10/1973 | Clark | 260/59 |

OTHER PUBLICATIONS

The Structure of Polymers, Miller, "Molecular—Weight Distributions," (1966), pp. 78–81.

*Primary Examiner*—Lester L. Lee
*Attorney, Agent, or Firm*—Raymond B. Ledlie

[57] ABSTRACT

Epoxy novolac resins having a narrow molecular weight distribution are prepared by dissolving an epoxy novolac resin prepared by conventional means in a suitable solvent such as xylene, cooling below 50°C until separation into 2 phases occurs, separating the two phases and removing the solvent therefrom thereby producing a resin of relatively low molecular weight and a resin of relatively high molecular weight wherein each resin has a narrow molecular weight distribution.

8 Claims, 1 Drawing Figure

EPOXY NOVOLAC RESINS HAVING A NARROW MOLECULAR WEIGHT DISTRIBUTION AND PROCESS THEREFOR

This application is a continuation-in-part of my previous application Ser. No. 350,277, filed Apr. 11, 1973 now abandoned.

This invention relates to epoxy novolac resins and a process for preparing them.

Epoxy novolac resins and processes for their preparation are well known. These resins usually have rather wide molecular weight distributions. Properties such as viscosity, functionality, and softening point of such resins are usually dependent upon the average molecular weight of such resins. In order to prepare epoxy novolac resins having a particular molecular weight, i.e. relatively low or relatively high, the resins are prepared at different ratios of aldehyde (e.g. formaldehyde) : phenolic hydroxyl containing compound (e.g. phenol). The preparation of relatively low average molecular weight epoxy novolac resins employ ratios of formaldehyde : phenol of 0.2:1 whereas for epoxy novolacs having a relatively high average molecular weight, formaldehyde : phenol ratios of 0.8 or 0.9:1 are employed. Each of the epoxy novolac resins have varying properties and utilities. For example, the lower average molecular weight resins are liquids to low melting solids usually employed as adhesives, laminates, coatings, and castings, whereas the higher molecular weight resins are higher melting e.g. above about 50°C and are usually employed as electrical varnishes, encapsulants, and molding powders.

It has now been discovered that epoxy novolac resins having a relatively low average molecular weight with an attendant narrow molecular weight distribution and a high molecular weight with attendant narrow molecular weight distribution can be prepared by the process of the present invention from an epoxy novolac resin having an intermediate average molecular weight. Each of the resins, i.e. the low average molecular weight resin and the high molecular weight resin, possess improved properties relative to an intended use compared to the same properties for the same intended use of the intermediate molecular weight resin or a resin of comparable average molecular weight but prepared by a direct process.

The epoxy novolac resins which are suitably employed in the process of the present invention are prepared by conventional means such as by reacting in the presence of an acidic catalyst e.g. oxalic acid, an aldehyde such as formaldehyde and an aromatic hydroxyl-containing compound such as phenol in an aldehyde:-phenol or like compound molar ratio suitable in preparing a novolac of intermediate molecular weight such as from about 0.4:1 to about 0.8:1 and preferably from about 0.46:1 to about 0.75:1. The excess phenol and water is then removed by any conventional means such as by flashing under vacuum. Then the resultant novolac resin is reacted with an excess of an epihalohydrin such as epichlorohydrin or glycerine dichlorohydrin in the presence of a basic catalyst such as, for example, benzyl trimethyl ammonium chloride. Then the resultant product is dehydrohalogenated with a base such as sodium hydroxide, sodium carbonate, mixtures thereof or the like. After washing with water until neutral and filtering, excess epihalohydrin is removed by flashing under vacuum thereby producing an epoxy novolac resin.

The process of the present invention comprises dissolving the epoxy novolac resin previously prepared by conventional means in a suitable solvent such as xylene at a solvent concentration of from about 30% to about 90% and preferably from about 50% to about 85% by weight based upon the total weight of solvent plus epoxy novolac resin at a temperature between 50°C and reflux temperature, preferably from about 70° to about 80°C for a time sufficient to dissolve the epoxy novolac resin. The resultant solution is then cooled to a temperature sufficient to cause a phase separation, usually from below about 50°C to the freezing point of the solvent and preferably from about 40° to about 45°C. The two distinct layers are then separated by any suitable means such as by decantation and the solvent removed therefrom by any suitable means such as flashing under vacuum.

In this process, the top layer or phase contains the epoxy novolac resin having a relatively low average molecular weight, whereas the bottom layer or phase contains the epoxy resin having a relatively high average molecular weight.

Aldehydes which may be suitably employed to prepare the epoxy novolac resins employed in the present invention include those aliphatic aldehydes having from 1 to about 6 carbon atoms such as, for example, formaldehyde, acetaldehyde, propionaldehyde, butyraldehyde, mixtures thereof and the like.

Aromatic hydroxyl-containing compounds which may be suitably employed to prepare the epoxy novolac resins employed in the present invention include those represented by the formula

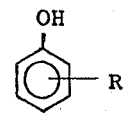

wherein R is hydrogen, a halogen such as bromine or chlorine, a hydroxyl group or an alkyl group having from 1 to about 6 carbon atoms. Suitable such compounds include, for example, phenol, methyl phenol, ethyl phenol, propyl phenol, hydroquinone, resorcinol, catechol, mixtures thereof and the like.

Suitable solvents which may be employed in the process of the present invention include, for example, xylene, toluene, methyl isobutyl ketone, solvents selected from those with solubility parameters of 8.0–9.0 with low to medium hydrogen bonding and those with solubility parameters <11.5 and any hydrogen bonding value as described in an article entitled "Quantification of the Hydrogen Bonding Parameter" by E. P. Lieberman, Official Digest, published by the Federation of Societies for Paint Technology, Easton, Pa., Jan. 1962, pp. 30–50, mixtures thereof and the like.

FIG. 1 is a graph or a plot for determining those epoxy novolac resins having weight average molecular weights above about 2,000 which are encompassed by the present invention. The area bounded by the points A,B,C,D is that which is encompassed by the present invention. The labeled points are those resins which illustrate the present invention and comparative experiments with respect to those resins having weight average molecular weights above about 2000. The weight average molecular weight (Mw) is plotted as the ordinate and the weight average molecular weight : number average molecular weight (Mw:Mn) is plotted as the obscissa. The coordinates for point A is Mw = 2000;

Mw:Mn = 2. The coordinates for point B is Mw = 6500; Mw:Mn = 5. The coordinates for point C is Mw = 11000;
Mw:Mn = 5. The coordinates for point D is Mw = 11000;
Mw:Mn = 2.

The epoxy novolac resins or the present invention are represented by the general formula

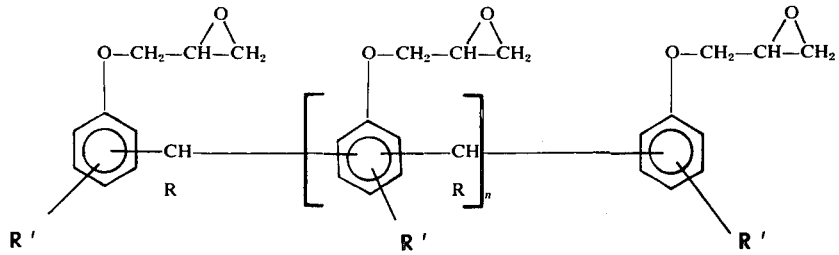

wherein each R is independently hydrogen or an alkyl group having from 1 to about 5 carbon atoms, each R' is independently hydrogen, a halogen such as bromine or chlorine, an alkyl group having from 1 to about 6 carbon atoms or a glycidyloxy group, i.e.

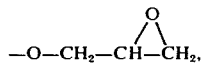

n has an average value greater than 0.1 and a relatively narrow molecular weight distribution such that in a plot of Mw as the ordinate and Mw:Mn as the obscissa, the point falls on or within the area bounded by A,B,C,D as shown in FIG. 1 for those resins having a weight average molecular weight above about 2000 and the viscosity in centistokes at 70°C to average EEW ratio is below about 11:1 for resins having a weight average molecular weight below about 2000.

In each of such expressions or determinations, the molecular weights are as determined by gel permeation chromatography.

The epoxy novolac resins of the present invention which are of relatively low molecular weight may be suitably employed as adhesives, laminates, coatings and castings, etc.

The epoxy novolac resins of the present invention which are relatively low in molecular weight i.e. those resins having a weight average molecular weight below about 2000 and viscosity in centistokes at 70°C : average EEW of <11:1 as compared to a conventionally prepared epoxy novolac resin having an average molecular weight of below about 2000 possess an improvement in one or more of the properties such as a reduction in viscosity, reduction in average EEW, increased heat distortion temperature, or increased flexural properties.

The epoxy novolac resins of the present invention which are of relatively high molecular weight may be suitably employed as electrical varnishes, encapsulants, and molding powders, etc.

The epoxy novolac resins of the present invention which are relatively high in molecular weight, i.e. those resins having a weight average molecular weight above about 2000 and a plot of Mw vs Mw:Mn falling on or within the area bounded by A,B,C,D in FIG. 1 as compared to a conventionally prepared epoxy novolac resin having an average molecular weight above about 2000 and a plot of Mw vs Mw:Mn falling outside the area bounded by A,B,C,D possess an improvement in one or more of the properties such as a reduction in solution viscosity, increased heat distortion temperature, increased flexural properties, a sharper melting point and improved flow properties, or a higher melting point (i.e. a grindable solid such that the resin can be ground without the particles sticking together).

The epoxy novolac resins of the present invention can be employed alone or they may be employed in admixture with other epoxy resin compositions. The resins of this invention can be cured by any of the conventional epoxy curing mechanisms, e.g. by employing such curing catalysts as tertiary amines, Lewis acids and the like or such coreactive crosslinking agents as primary and secondary amine-containing compounds, polycarboxylic acids and anhydrides, mercaptans, dicyandiamide, and the like.

The epoxy novolac resins of the present invention may be admixed with inert materials such as, for example, pigments, fillers, extenders, flexibilizers, mold release agents, solvents, flow control agents and the like, as well as with reactive diluents, accelerators, fire retardant agents and the like.

The following examples are illustrative of the present invention, but are not to be construed as to limiting the scope thereof in any manner.

In the following examples, the molecular weight data was obtained by gel permeation chromatography.

EXAMPLE I

A novolac resin having a 96°C Durran's softening point was prepared using a 0.75:1 mole ratio of formaldehyde to phenol.

Formaldehyde was fed into phenol (containing 0.6 wt. % oxalic acid) at 100°C over approx. 1 hour period. This was reacted 1 hour and then the excess phenol and water were removed under vacuum to 180°C. The resulting novolac was dissolved in 5 moles epichlorohydrin per equivalent of novolac or about a 4.5:1 wt. ratio. 60% aqueous benzyltrimethyl ammonium chloride (about 3% of novolac wt.) was added and reacted at 60°C for 4 days. The resulting novolac polychlorohydrin ether was dehydrochlorinated at about 20°–25°C using 50% excess aqueous solution containing 15% NaOH and 10% Na$_2$CO$_3$ for 90 and 60 minutes respectively. This was washed with water until neutral and the excess epichlorohydrin and water were removed under vacuum to 160°C to yield an epoxy novolac having a 170 epoxide equivalent weight, 5.4 average functionality, a 52°C Durran's softening point, a weight average molecular weight of 2850, and a weight to number average molecular weight ratio (Mw:Mn) of 3.098 (this resin is designated as I in FIG. 1). This epoxy novolac was mixed at 20 weight percent solids in xylene and heated to 80°C to effect solution. This was then cooled to 40°C until separation into two phases occurred. The phases were separated and the solvent removed from each phase. The low molecular weight or soluble phase (45% of original resin weight) had a 166.7 epoxide equivalent weight, 3.67 functionality, a neat viscosity of 1177 cs at 70°C, a weight average molecular weight of 1112, and a viscosity in centistokes at 70°C : average EEW ratio of 7.06:1. The higher molecular weight or insoluble phase (48.8% of original resin weight) had an epoxide equivalent weight of 181.4, 9.5 functionality, an 85°C Durran's softening point, a weight average molecular weight of 4978, a weight average molecular weight to number average molecular weight ratio of 2.891:1, and a 50 weight percent acetone solution viscosity at 25°C of 11.95 cs.

Samples of the low molecular weight fraction were cured with stoichiometric quantities of methylene dianiline for 16 hours at 125°C plus 2 hours at 175°C. These samples are designated as I-1-A.

Additional samples were cured as above plus an additional 2 hours at 225°C. These samples are designated as I-1-B.

The physical properties of samples I-1-A and I-1-B as well as the properties of the uncured resin designated as I-1 are given in Table I.

Samples of the high molecular weight fraction were cured with stoichiometric quantities of 4,4'-methylene bis(o-chloroaniline) for 16 hours at 140°C plus 2 hours at 175°C plus 2 hours at 250°C. These samples are designated as I-2. The physical properties of these cured samples, as well as the properties of the uncured resin, also designated as I-2, are given in Table II.

EXAMPLE II

An epoxy novolic was prepared as in Example I from a novolac with a 101°C Durran's softening point. The epoxy novolac had a 176.2 epoxide equivalent weight, 5.45 functionality, a 57°C Durran's softening point, a weight average molecular weight of 2869, and a weight to number average molecular weight ratio of 2.990 (this resin is designated as II-A in FIG. 1). This resin was fractionated at 20 weight percent solids in xylene. The low molecular weight fraction (46.3% of original resin weight) had a 166.7 epoxide equivalent weight, 3.53 functionality, a neat viscosity of 1683 cs at 70°C, a weight average molecular weight of 869, and a viscosity in centistokes at 70°C : average EEW ratio of 10.1:1. The higher molecular weight fraction (52.9% of original resin weight) had a 180.2 epoxide equivalent weight, 9.5 functionality, an 87°C Durran's softening point, a weight average molecular weight of 4463, a weight average molecular weight to number average molecular weight ratio of 2.605:1, and a 50 weight percent acetone solution viscosity at 25°C of 11.84 cs (this resin is designated as II-B in FIG. 1).

EXAMPLE III (COMPARATIVE)

Preparation of Low Molecular Weight Conventional Epoxy Novolac

A novolac resin was prepared using 0.46:1 formalin to phenol mole ratio. Each equivalent of novolac was dissolved in 5 moles epichlorohydrin. This was heated to 100°C and 10% excess aqueous 50% NaOH was added slowly over approximately 2 hours. The excess epi was removed under vacuum to 150°C. This was then diluted with toluene to 15% solids and water washed to remove NaCl. The toluene was flashed under vacuum to 150°C to yield an epoxy novolac having the following properties:

| | |
|---|---|
| weight average molecular weight | 1081 |
| number average molecular weight | 609 |
| EEW, average | 179.2 |
| Functionality | 3.4 |
| Viscosity at 70°C, cs (centistokes) | 2542 |
| Viscosity in centistokes at 70°C to EEW ratio | 14.19:1 |

Cured samples were prepared employing stoichiometric quantities of methylene dianiline and curing at 125°C for 16 hours plus 2 hours at 175°C. The samples were designated as III-A.

Cured samples were also prepared as above except that they were cured an additional 2 hours at 225°C. These samples are designated as III-B.

The properties of these samples as well as the properties of the uncured resin designated as III are given in Table I.

EXAMPLE IV (COMPARATIVE)

Preparation of High Molecular Weight Conventional Epoxy Novolac

A novolac resin was prepared using a 0.72:1 mole ratio of formaldehyde to phenol.

Formaldehyde was fed into phenol (containing 0.6 wt. % oxalic acid) at 100°C over approx. 1 hour period. This wass reacted 1 hour and then the excess phenol and water were removed under vacuum to 180°C. The resulting novolac was dissolved in 5 moles epichlorohydrin per equivalent of novolac or about a 4.5:1 wt. ratio. 60% aqueous benzyl trimethyl ammonium chloride (about 3% of novolac wt.) was added and reacted at 60°C for 4 days. The resulting novolac polychlorohydrin ether was dehydrochlorinated at about 20°–25°C using a 50% excess aqueous solution containing 15% NaOH and 10% $Na_2CO_3$ for 90 and 60 minutes respectively. This was washed with water until neutral and the excess epichlorohydrin and water were removed under vacuum to 160°C to yield an epoxy novolac having a 173.2 epoxide equivalent weight, a 6.14 average functionality, a 62.5°C Durran's softening point, a weight average molecular weight of 4386 and a weight average molecular weight to number average molecular weight ratio of 4.124:1 (this resin is designated as IV in FIG. 1).

Cured samples were prepared using a stoichiometric quantity of 4,4'-methylenebis(o-chloroaniline) and curing for 16 hours at 140°C plus 2 hours at 175°C plus 2 hours at 250°C.

These samples are designated as IV and these properties as well as the properties of the uncured resin are reported in Table II.

TABLE I

| PROPERTY (UNCURED) | SAMPLE NUMBERS | |
| --- | --- | --- |
| | Present Invention I-1 | Comparative III |
| Wt. avg. mol. wt. | 1112 | 1081 |
| No. avg. mol. wt. | 612 | 609 |
| EEW. avg. | 166.7 | 179.2 |
| Functionality | 3.67 | 3.40 |
| Viscosity at 70°C, cs | 1177 | 2542 |
| Viscosity :avg. EEW | 7.06:1 | 14.18:1 |

| PROPERTY (CURED) | Present Invention I-1-A | Comparative III-A | Present Invention I-1-B | Comparative III-B |
| --- | --- | --- | --- | --- |
| Heat distortion temp., °C | 198 | 194.5 | 243.5 | 217 |
| Flexural strength, psi | 6600 | 9000 | 8400 | 7990 |
| Flexural modulus, psi × $10^5$ | 4.03 | 3.93 | 3.895 | 4.07 |

Table II

| PROPERTY (UNCURED) | SAMPLE NUMBER | |
| --- | --- | --- |
| | Present Invention I-2 | Comparative IV |
| Wt. avg. mol. wt. | 4978 | 4386 |
| No. avg. mol. wt. | 1722 | 1064 |
| $M_w:M_n$ | 2.891 | 4.124 |
| EEW | 181.4 | 173.3 |
| Functionality (avg.) | 9.5 | 6.14 |
| Durran's softening point, °C | 85 | 62.5 |

| PROPERTY (CURED) | I-2 | IV |
| --- | --- | --- |
| Heat distortion temp. | >250 | >250 |
| Flexural Strength, psi | 12,250 | 10,200 |
| Flexural modulus, psi × $10^5$ | 4.85 | 4.6 |

EXAMPLE V

A. An epoxy novolac was prepared as in Example I from a novolac with a 104°C Durran's softening point. The resulting epoxy novolac had a 170.6 epoxide equivalent weight, 5.44 functionality, a 56°C Durran's softening point, a weight average molecular weight of 2,688, and a weight to number average molecular weight ratio of 2.897 (this resin is designated as V-A in FIG. 1).

B. After fractionation according to the procedure of Example I, the higher molecular weight fraction (45.8% of original weight) had a 175.5 epoxide equivalent weight, 9.9 functionality, an 88°C Durran's softening point, a weight average molecular weight of 4580, a weight average molecular weight to number average molecular weight ratio of 2.633:1, and a 50% acetone solution viscosity at 25°C of 12.56 cs (this resin is designated as V-B in FIG. 1).

EXAMPLE VI

A. An epoxy novolac was prepared as in Example I from a 90°C Durran's softening point novolac, had a 172 epoxide equivalent weight, 4.88 functionality, a 51°C Durran's softening point, a weight average molecular weight of 2,101, and a weight to number average molecular weight ratio of 2.504 (this resin is designated as VI-A in FIG. 1).

B. The higher molecular weight portion from fractionation (43.4% of original weight) as in Example I had a 182.2 epoxide equivalent weight, 8.2 functionality, an 82°C Durran's softening point, a weight average molecular weight of 3,671, a weight average molecular weight to number average molecular weight ratio of 2.453, and a 50% acetone solution viscosity at 25°C of 10.50 cs (this resin is designated as VI-B in FIG. 1).

EXAMPLE VII

An epoxy novolac resin similar to that of Example II-A was fractionated on a larger scale and resulted in a higher molecular weight portion with a 183.8 epoxide equivalent weight, 9.22 functionality, an 84°C Durran's softening point, a weight average molecular weight of 4,752, and a weight average molecular weight to number average molecular weight ratio of 2.804. 52% of the original resin weight was recovered as the higher molecular weight product (this resin is designated as VII in FIG. 1).

EXAMPLE VIII

An epoxy novolac resin having a 179.2 epoxide equivalent weight, 3.40 functionality, a Durran's softening point of less than 50°C, a weight average molecular weight of 1,081, and a weight to number average molecular weight ratio of 1.774 was fractionated as in Example I. The unfractionated resin is designated as VIII-A in FIG. 1. The resulting resin had a 207.7 epoxide equivalent weight, 5.18 functionality, a 67.5°C Durran's softening point, a weight average molecular weight of 2,154, and a weight average molecular weight to number average molecular weight ratio of 2.002. The 50% acetone solution viscosity at 25°C was 7.9 cs (this resin is designated as resin VIII-B in FIG. 1).

EXAMPLE IX

The following example is essentially a repeat of Example 1 in U.S. Pat. No. 2,829,124 for purposes of comparison.

213.6 grams of 88% phenolic solution and 162.4 grams of water were charged into a reactor. 5.8 grams of concentrated sulfuric acid (95.0–98.0%) was added. The acidified solution was heated to 80°C, then 80.6 grams of 37.2% formaldehyde was added to the stirred acidified solution over a period of 4 hours while the temperature was maintained at 80°C.

Upon the completion of the addition of the formaldehyde solution, the temperature was maintained at 80°C for an additional period of a half hour, after which 8.0 grams of sodium carbonate was added to neutralize the acid.

The system was then placed under vacuum at a pressure of 35 mm mercury and water distilled by heating until the temperature reached 80°C. Then, additional water was slowly added to the system at a rate such that the distillation temperature was held approximately constant at 80°C. The addition of water was continued until the total distillate collected amounted to 630 grams.

The still residue was then used, it being the novolac resin. 50 grams of the resin was then dissolved in 75.0 grams of methyl ethyl ketone and 81.0 grams of epichlorohydrin. The resulting solution was then heated; 40.0 grams of 50% sodium hydroxide solution were added gradually with stirring over a 4-hour period to the warmed solution at about 80°C. After the NaOH solution had been added the temperature was maintained at 80°C for an additional one-half hour.

The aqueous layer containing salt was then withdrawn from the reactor. The organic layer containing the resin was washed twice with 100 ml of $H_2O$ to complete the removal of salt. The washed organic layer was then distilled to remove most of the methyl ethyl ketone. The remaining solution was then stripped under vacuum to remove the remaining solvent.

The resultant resin was a very viscous liquid at room temperature and was a clear amber color. The resin had the following properties:

| | |
|---|---|
| % epoxide | = 19.98 |
| average EEW | = 215 |
| viscosity | = 1360 centistokes at 70°C |
| Mw | = 2405 |
| Mn | = 616 |
| Mw:Mn | = 3.905 |

The plot of Mw vs Mw:Mn is designated as IX in FIG. 1.

What is claimed is:

1. An epoxy novolac resin having a relatively narrow molecular weight distribution represented by the general formula

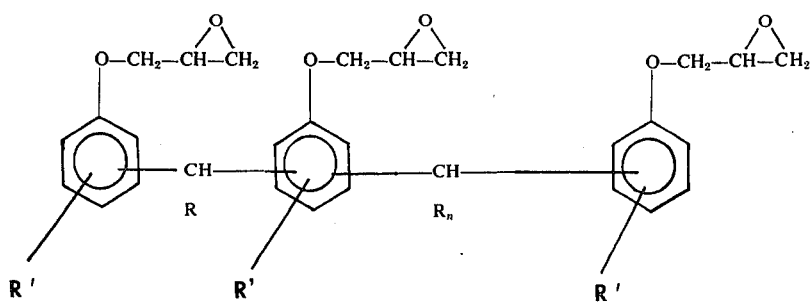

wherein each R is independently hydrogen or an alkyl group having from 1 to about 5 carbon atoms, each R' is independently hydrogen, chlorine, bromine, an alkyl group having from 1 to about 6 carbon atoms or a glycidyloxy group and $n$ has an average value greater than 0.1 and such that the viscosity in centistokes at 70°C to average EEW, epoxide equivalent weight, ratio is less than 11:1 when the weight average molecular weight of the resin is below about 2000 and a plot of Mw vs Mw:Mn falling on or within the area bounded by A,B,C,D in FIG. 1 when the weight average molecular weight is above about 2000.

2. The epoxy novolac resin of claim 1 wherein each R and R' is hydrogen.

3. A process for preparing an epoxy novolac resin having a relatively narrow molecular weight distribution which comprises
  A. dissolving an epoxy novolac resin having a relatively wide molecular weight distribution in a solvent or mixture of solvents selected from the group consisting of xylene, toluene, methyl isobutyl ketone, solvents selected from those with solubility parameters of 8.0–9.0 with low to medium hydrogen bonding and those with solubility parameters >11.5 and any hydrogen bonding value at a temperature between about 50°C and the boiling point of the solvent, wherein the quantity of solvent is from about 30% to about 90% by weight of the combined weight of solvent and resin,
  B. cooling the resultant solution to a temperature between below about 50°C and the freezing point of the solvent for a period of time sufficient to cause a separation into two distinct phases,
  C. separating the two phases one from the other,
  D. removing the solvent from each of the phases; thereby producing (1) an epoxy novolac resin of relatively low molecular weight and (2) an epoxy novolac resin of relatively high molecular weight and wherein the weight average molecular weight of resin (1) is below about 2000 and for resin (2) above about 2000, and wherein the viscosity in centistokes at 70°C to average EEW, epoxide equivalent weight, ratio of resin (1) is below about 11:1 and wherein a plot of Mw vs Mw:Mn for resin (2) falls on or within the boundary of A,B,C,D in FIG. 1.

4. The process of claim 3 wherein the step (A) is performed at from about 70° to about 80°C, step (B) is performed at from about 45° to about 50°C, and wherein the quantities of solvent is from about 50% to about 80% by weight of the combined weight of solvent and resin.

5. The process of claim 4 wherein the solvent is xylene.

6. A curable composition comprising an epoxy novolac resin of claim 1 and a catalytic quantity of a catalyst or a curing amount of a curing agent therefor.

7. A curable composition comprising an epoxy novolac resin of claim 2 and a catalytic quantity of a catalyst or a curing amount of a curing agent therefor.

8. The composition of claim 7 wherein the curing agent is methylene dianiline, or 4,4'-methylene bis (o-chloroaniline).

* * * * *

UNITED STATES PATENT OFFICE
CERTIFICATE OF CORRECTION

PATENT NO. : 3,928,288
DATED : December 23, 1975
INVENTOR(S) : Eddie Bob Walker

It is certified that error appears in the above-identified patent and that said Letters Patent are hereby corrected as shown below:

Col. 6, line 42, change "wass" to --was--.

Claim 1, the formula should read as follows:

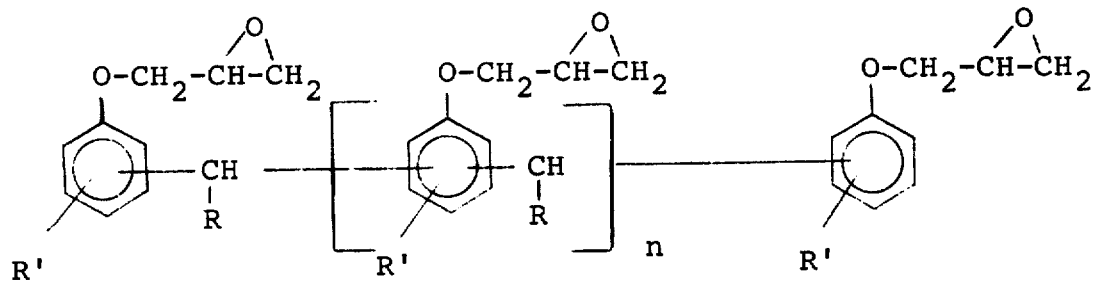

Signed and Sealed this

Twenty-seventh Day of July 1976

[SEAL]

Attest:

RUTH C. MASON
Attesting Officer

C. MARSHALL DANN
Commissioner of Patents and Trademarks